United States Patent
Freyermuth et al.

(10) Patent No.: US 10,105,761 B2
(45) Date of Patent: Oct. 23, 2018

(54) ASSEMBLY FOR TIGHTENING AND SECURING MALE AND FEMALE PARTS FITTED TOGETHER

(71) Applicant: SECO-E.P.B.(SOCIETE PAR ACTIONS SIMPLIFIEE), Bouxwiller (FR)

(72) Inventors: Alain Freyermuth, Pfaffenhoffen (FR); Mathieu Ostermann, Allenwiller (FR); Yannick Groll, Strasbourg (FR); Pascal Krumhorn, Dauendorf (FR)

(73) Assignee: SECO-E.P.B.(SOCIETE PAR ACTIONS SIMPLIFIEE), Bouxwiller (FR)

( * ) Notice: Subject to any disclaimer, the term of this patent is extended or adjusted under 35 U.S.C. 154(b) by 0 days.

(21) Appl. No.: 14/438,128

(22) PCT Filed: Oct. 24, 2013

(86) PCT No.: PCT/FR2013/052548
§ 371 (c)(1),
(2) Date: Apr. 23, 2015

(87) PCT Pub. No.: WO2014/064393
PCT Pub. Date: May 1, 2014

(65) Prior Publication Data
US 2015/0290718 A1    Oct. 15, 2015

(30) Foreign Application Priority Data
Oct. 25, 2012 (FR) .................................... 12 60186

(51) Int. Cl.
*B23B 31/19* (2006.01)
*B23B 31/10* (2006.01)
(Continued)

(52) U.S. Cl.
CPC .............. *B23B 31/11* (2013.01); *F16D 1/108* (2013.01); *B23B 2260/106* (2013.01);
(Continued)

(58) Field of Classification Search
CPC .............. B23B 31/11; B23B 2260/106; B23B 2260/138; B23B 2265/32; B23B 31/19;
(Continued)

(56) References Cited

U.S. PATENT DOCUMENTS 6,371,705 B1 *  4/2002  Gaudreau ........... B23B 31/1179
                                                    279/156
6,726,412 B2 *  4/2004  Sugata ............... B23Q 11/1023
                                                    279/20
(Continued)

FOREIGN PATENT DOCUMENTS

DE          53508 C       9/1890

*Primary Examiner* — Bayan Salone
(74) *Attorney, Agent, or Firm* — Corinne R. Gorski

(57) ABSTRACT

An assembly for tightening and securing includes a first male part and a second female part fitted together, which have complementary forms. The fitting includes at least one contact surface of the first part with the second part. The assembly also includes at least one annular means mounted on the periphery of one of the two parts. The annular means is connected in a translational manner to the part on which the annular means is mounted when the annular means abuts with the part on which the means is mounted, and arranged to interact with a peripheral surface of the complementary part during a rotation of the annular means in relation to the complementary part.

12 Claims, 4 Drawing Sheets

(51) Int. Cl.
  *B23B 31/26* (2006.01)
  *F16D 1/108* (2006.01)
  *B23B 31/11* (2006.01)
  *F16D 1/10* (2006.01)

(52) U.S. Cl.
  CPC ..... *B23B 2260/138* (2013.01); *B23B 2265/32* (2013.01); *F16D 2001/102* (2013.01); *Y10T 29/49895* (2015.01); *Y10T 29/49897* (2015.01); *Y10T 279/17931* (2015.01); *Y10T 279/17941* (2015.01); *Y10T 279/17948* (2015.01)

(58) Field of Classification Search
  CPC ... B23B 31/266; B23B 31/1074; F16D 1/108; F16D 2001/102; Y10T 29/49895; Y10T 29/49897; Y10T 279/17931; Y10T 279/17941; Y10T 279/17948; Y10T 279/17923; Y10T 279/16
  USPC ............. 29/428, 464, 465; 279/99–101
  See application file for complete search history.

(56) References Cited

U.S. PATENT DOCUMENTS

| | | | |
|---|---|---|---|
| 7,144,207 B2* | 12/2006 | Weigel | B23B 31/11 251/112 |
| 7,325,471 B2* | 2/2008 | Massa | B23B 27/12 279/8 |
| 8,042,437 B2* | 10/2011 | Maier | B23B 29/043 408/226 |
| 8,474,831 B2* | 7/2013 | Freyermuth | B23B 31/028 279/105.1 |
| 8,490,274 B2* | 7/2013 | Asai | B21D 28/04 269/71 |
| 2004/0084855 A1* | 5/2004 | Stenson | B23B 31/028 279/53 |
| 2008/0054575 A1 | 3/2008 | Hartmann | |
| 2008/0247832 A1* | 10/2008 | Maier | B23B 29/043 407/40 |
| 2009/0184479 A1* | 7/2009 | Guy | B23B 31/006 279/99 |
| 2010/0066037 A1* | 3/2010 | Freyermuth | B23B 31/028 279/20 |

* cited by examiner

ASSEMBLY FOR TIGHTENING AND SECURING MALE AND FEMALE PARTS FITTED TOGETHER

RELATED APPLICATION DATA

This application is a § 371 National Stage Application of PCT International Application No. PCT/FR2013/052548 filed Oct. 23, 2013 claiming priority of FR Application No. 1260186, filed Oct. 25, 2012.

TECHNICAL FIELD

The present disclosure relates to the field of systems for assembling a tool on a machine and more particularly to systems for securing a tool, such as a cutting tool, and its tool holder or a tool holder onto a rotary machine.

BACKGROUND

Currently, the securing of two parts, which can be a tool and a tool holder or a tool holder and a machine, is performed by fitting the end of one first part which forms a male end into the end of the second part which forms a female end. Taking into account the level of precision required for assembling and securing the tool to the machine by means of the tool holder, it is essential that the adjustment of the parts relative to one another is performed in a secure manner to avoid the formation of play between the parts which could be the cause of vibration during their functioning.

To ensure this kind of secure adjustment, a first solution consists of having a particular dimension of the male and female parts. The end of the part which forms the male element has an outer diameter which is only slightly greater than the inner diameter of the opening of the female element into which the male element is inserted. The securing by inserting the two parts is then performed by close fitting.

Another solution has been proposed by the publication of patent application US 2008/0247832. This solution makes it possible to avoid having a heating stage by providing an additional element in the form of a threaded rod traversing the end of one of the parts and designed to be inserted into a complementary threaded tapped opening positioned inside the opening of the female element. The threaded rod is mounted to rotate freely and be fixed in translation to the end of the part which supports it. The end of the threaded rod which is not inserted into the tapped opening is accessible to a user to enable the axial rotation of the threaded rod and therefore to enable, during the fitting of the end of the male part into the female part, the approach and tight securing of the parts to one another. However, a solution of this kind has the disadvantage of deforming the parts which bear on the one hand frictional force on the peripheral surfaces and on the other hand traction on the axis of the threaded rod which performs the tightening of the parts to one another. The resulting deformation of the parts is thus detrimental to the quality of the connection of the parts to one another and can cause the secure connection to break. Furthermore, a construction of this kind also has the disadvantage under force of not being able to prevent the disconnection or detachment of the tool and the tool holder at the periphery of the junction between the parts.

Document US 2008/0054575 proposes a solution for securing a tool and a tool holder by using a ring for tightening the parts. The tightening ring is installed and held in position by a part for preventing translational movement which can be in the form of a clipping disc, a toric ring or a nut. However, in the different embodiments proposed by this document, the tightening ring is held in position by using a locking part which is machined specifically and designed for this function.

SUMMARY

The aim of the present disclosure is to overcome these disadvantages by proposing a system for securing the parts to one another which make it possible to avoid the problems of deformation and facilitate the tightened assembly of the parts to one another, at the same time preventing a translational movement of a tightening ring of additional parts without using an element specifically designed for this function.

The subject matter of the disclosure is thus an assembly for tightening and securing a first male part and a second female part fitted together which have complementary forms, the fitting including at least one contact surface of the first part with the second part, characterised in that the assembly is formed by at least one annular means mounted on the periphery of one of the two parts, the annular means being connected in a translational manner with the part on which the annular means is mounted when the annular means abuts with the part on which the means is mounted, and arranged to interact with the periphery of the complementary part during the rotation of the annular means relative to the complementary part, the annular means being held in a translational manner between on the one hand the stop of the part on which the means is mounted and on the other hand the edge of a support structure to which the part is fixed on which the means is mounted.

The disclosure also relates to a method for assembling a first male part with a second female part which have complementary forms by means of a tightening and securing assembly according to the disclosure, characterised in that the method includes in particular:

a stage of positioning the male and female parts relative to one another, a stage of contacting the annular means with the periphery of the part which is complementary to the one which supports the annular means, a stage of pivoting the annular means in relation to the periphery of the part which is complementary to the one which supports the annular means.

BRIEF DESCRIPTION OF THE DRAWINGS

The disclosure is explained in more detail by means of the following description which relates to a preferred embodiment and is given as a non-limiting example only, and explained with reference to the accompanying drawings in which.

DETAILED DESCRIPTION

Figure 1:
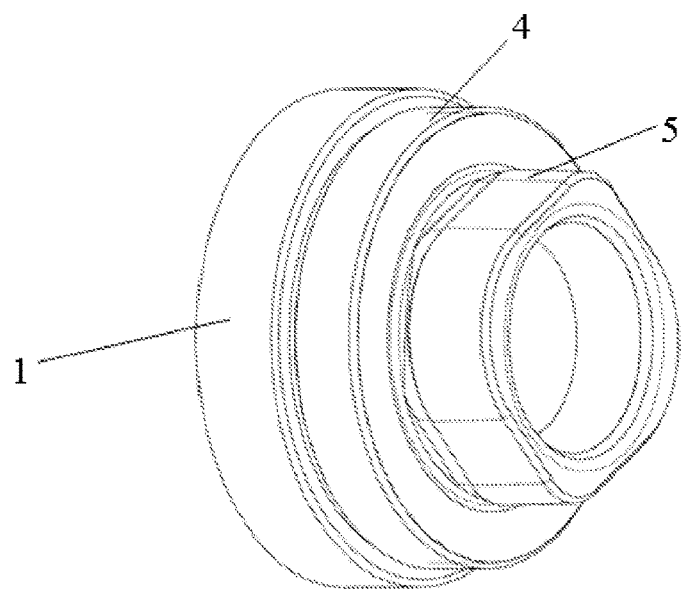
FIG. 1 relates to an oblique schematic representation of an example of the male part of the tightening assembly of the disclosure, FIG. 2 relates to an oblique schematic representation of an example of the female part of the tightening assembly of the disclosure, FIG. 3 relates to a schematic representation of a cross-section of parts of the tightening assembly of the disclosure according to a plane perpendicular to the fitting axis of the parts of the tightening assembly, FIG. 4 relates to a schematic representation of a cross-section of a first embodiment of parts of the tightening assembly of the disclosure according to the axis of securing the fitting of parts of the tightening assembly, FIG. 5 relates to a schematic representation of a cross-section of a second embodiment of parts of the tightening assembly of the disclosure according to the axis for securing the fitting of parts of the tightening assembly, FIG. 6 relates to a schematic representation of a cross-section of a third embodiment of parts of the tightening assembly of the disclosure according to the fitting securing axis of the parts of the tightening assembly, FIG. 7 relates to a schematic representation of a cross-section of a fourth embodiment of parts of the tightening assembly of the disclosure according to the securing fitting axis of parts of the tightening assembly, FIG. 8 relates to a schematic representation of a cross-section of a fifth embodiment of parts of the tightening assembly of the disclosure according to the securing fitting axis of parts of the tightening assembly.
Figure 2:
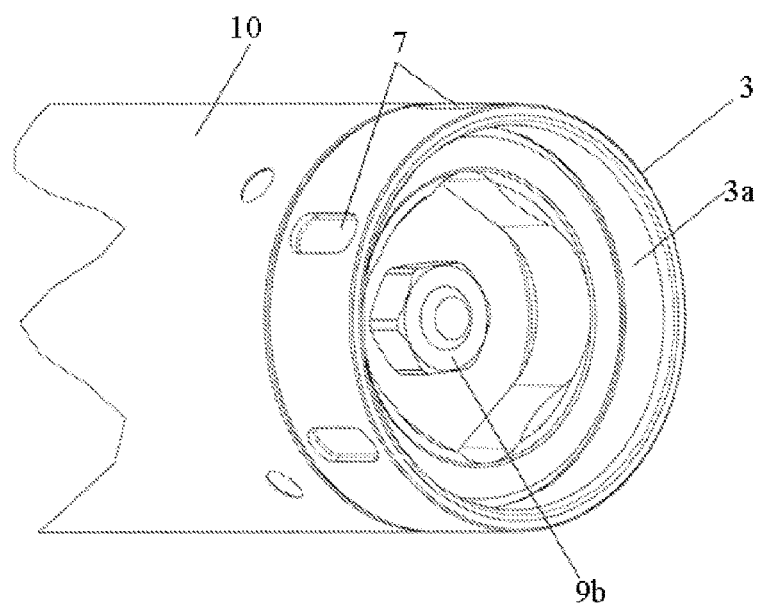
Figure 3:
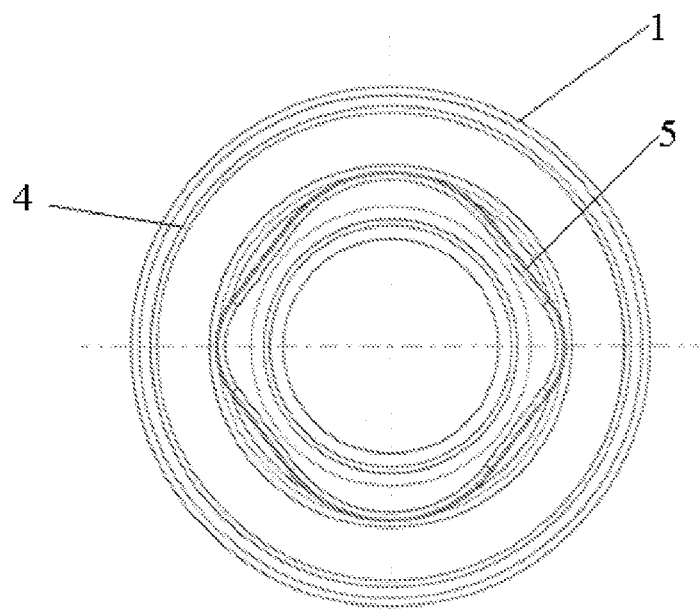

Referring to FIGS. 1 and 2, the present disclosure relates to an assembly for tightening and securing a first male part 1 and a second female part 2 fitted together which have complementary forms, the fitting including at least one contact surface of the first part 1 with the second part, characterised in that the assembly also includes at least one annular means 3 mounted on the periphery of one of the two parts. The annular means 3 functions so as to be connected in a translational manner to the part on which the annular means 3 is mounted when the annular means 3 abuts with the part on which the means 3 is mounted, and is arranged to interact with a peripheral surface 4 of the complementary part during a rotation of the annular means 3 in relation to the complementary part.

Figure 4:
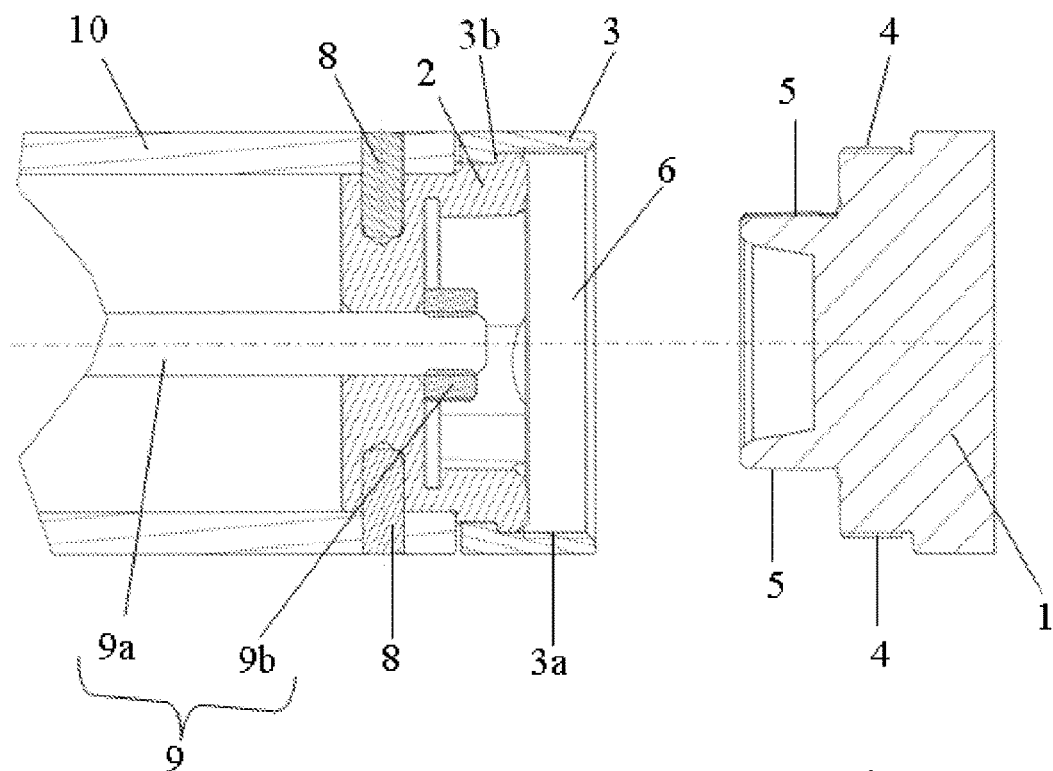

Referring to FIG. 4, the annular means 3 is held in a translational manner between, on the one hand, the stop of the part on which the means 3 is mounted and on the other hand the edge of a support structure 10 to which the part is fixed on which the means 3 is mounted. The use of a support structure 10 for locking the annular means 3 in a translational manner makes it possible to avoid the assembly of an element specifically designed for this purpose. The support structure 10 is thus preferably a structural element of the tool or tool holder.

The contact surface formed by fitting can relate to a peripheral contact surface 5, for example of the radial type, in relation to the fitting axis, or even to a substantially plane contact surface according to a plane perpendicular to the fitting axis, i.e. formed by the ends each in contact with parts of the fitting.

It should be noted that the annular means 3 can also be a ring, for example a band, mounted or integrated at one end of one of the two parts, male 1 or female 2 part, and an element including an annular lip 3a mounted or integrated at the end of one of the two parts.

Figure 5:
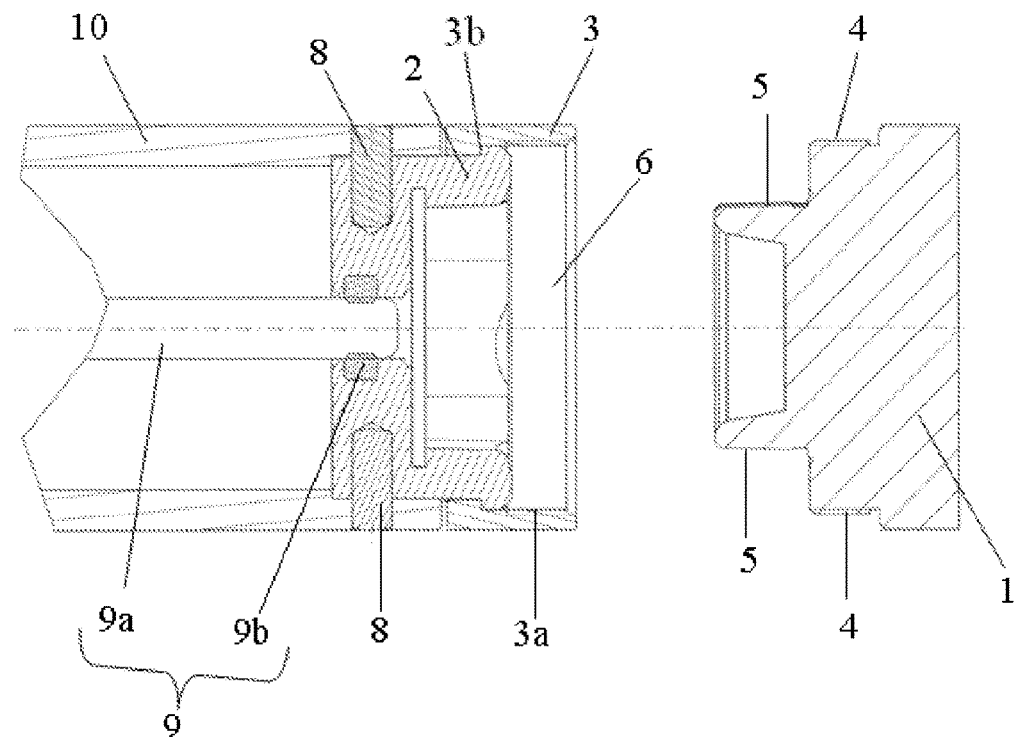
Figure 6:
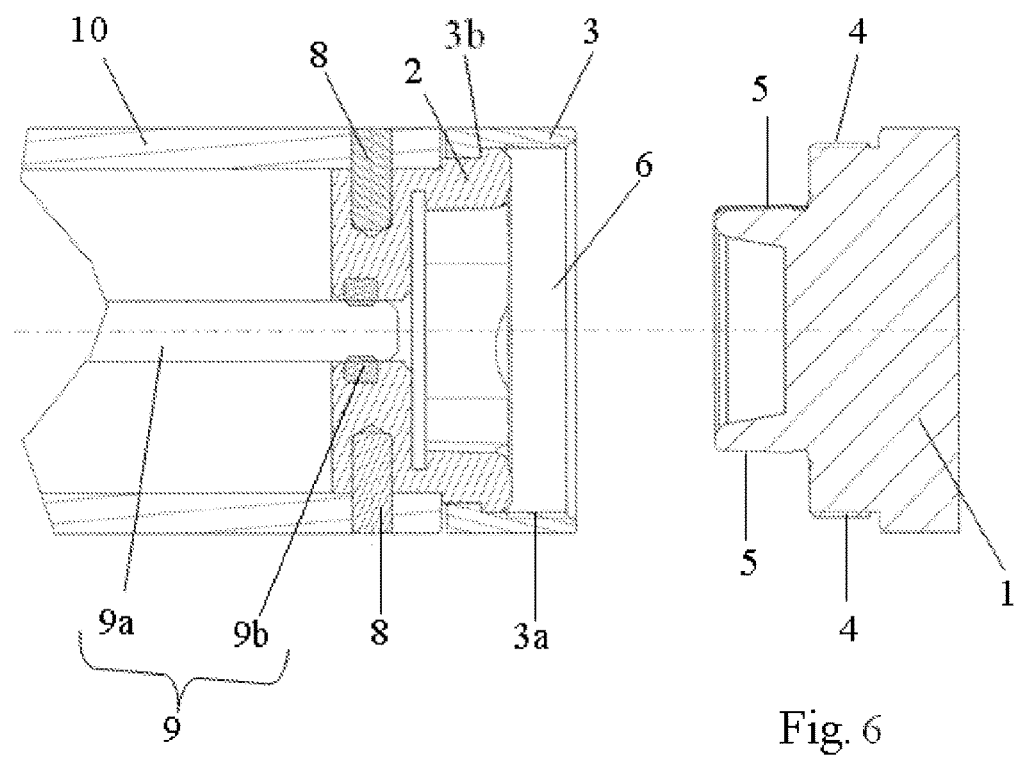

The part 3b of the annular means 3 designed to abut with the part on which the annular means 3 is mounted, can be formed by the edge 3b of a shoulder on the annular means 3, as shown in the embodiments of FIGS. 4, 5 and 6. Alternatively, the part of the annular means 3 designed to come into abutment can be formed by any other adapted edge designed to limit the axial displacement of the annular means 3 relative to the part on which the means 3 is mounted.

The parts, the male 1 and female 2 part respectively, of the disclosure relate to parts of tools, for example cutting tools, or tool holders, or equally to parts of the machine designed to secure a tool and/or a tool holder. According to one feature, the assembly of the disclosure is arranged for assembly on machines providing a rotary movement around an axis formed by the tool axis.

Within the scope of the disclosure, the male-female interaction between the two parts of the tightening assembly of the disclosure can be operated by any complementarity of known forms, in particular relating to the form of the respective cross-sections of the male 1 and female 2 parts. A non-limiting example of complementary forms which can be used in combination with the tightening assembly of the disclosure is thus a cross-section of polylobed type male 1 and female 2 parts comprising possibly one or more conical faces.

According to one advantage of the disclosure, the construction of the male-female interaction with a polylobed type cross-section comprising plane and conical faces makes it possible to obtain an assembly system with a locating pin or a locating pin system. An arrangement of this kind thus enables for example assembly in two alternative positions at 180°, in three alternative positions at 120°, in four alternative positions at 90°, in six alternative positions at 60°, etc.

According to a preferred embodiment of the disclosure, the male-female interaction between the two parts is performed in an axis of translation which corresponds to the axis of rotation transmitted by the machine to the tool and/or to the tool holder.

According to a preferred embodiment of the disclosure, the annular means 3 of the tightening assembly of the disclosure is mounted to be fixed in a translational manner and loosely in rotation with the part on which the means 3 is mounted. This particular arrangement enables the interaction of the annular means 3 with a peripheral surface 4 of the complementary part while enabling independent mobility of the part which supports the annular means 3 in at least one plane. The independent mobility, i.e. this rotation, of the annular means 3 in relation to the part which supports it thus enables the actuation of the securing and tightening assembly of the disclosure which is adjusted for parts which cannot be displaced relative to the complementary part during the tightening or securing.

According to a non-limiting embodiment of the disclosure, the annular means 3 is mounted on the part which supports it by means of a ball bearing or even a shoulder where the annular means 3 would be inserted.

According to one particular feature, the inner edge of the annular means 3, for example the inner edge of a lip 3a of the annular means 3, comprises a tapping, the screw pitch of which is identical to the pitch of a thread on a peripheral surface 4 of the complementary part with which the annular means 3 interacts. This arrangement is an embodiment which enables interaction by screwing the annular means 3 onto a peripheral surface 4 of the complementary part in order to ensure on the one hand the sliding of the male part 1 relative to the female part 2 and on the other hand a tightening which is progressive and controlled according to the extent of screwing the annular means 3 relative to the threaded peripheral surface 4 of the complementary part.

To optimise the tightening the tightening and securing assembly of the disclosure can be characterised in that the annular means 3 includes a surface for interacting 7 with a tightening tool formed by least one edge.

According to a non-limiting feature of the disclosure, the annular means includes a means for locking the annular means 3 designed to interact with a complementary element on a peripheral surface 4 of the complementary part. According to one embodiment the locking means on a complementary element can be formed by a clipping or clickable means of a known type. When the annular means 3 exhibits play in its tightening interaction with the peripheral surface 4 of the complementary part, the locking means makes it possible to avoid the accidental loosening of the male and female parts from the rotational movement transmitted by the machine.

According to a preferred embodiment of the tightening assembly of the disclosure, the sliding surface 3*a* of the annular means 3 against the peripheral surface 4 of the complementary part is arranged in the proximity of the frictional surface 5 of the first male part 1 with the second female part 2. The sliding surface of the annular means 3 against the peripheral surface 4 of the complementary part forms a substantially cylindrical surface which can be defined by a first radius R1 in relation to the axis of rotation forming the centre of the cylinder. Although, because of the particular forms that the male 1 and female 2 parts can have, the frictional surface 5 of the first male part 1 against the second female part 2 is not necessarily in the form of a cylinder, the frictional surface can be equated with an average or weighted cylindrical surface which can be defined by a second radius R2 in relation to the axis of rotation forming the centre of the cylinder. Alternatively, the frictional surface 5 of the first male part 1 against the second female part 2 can also be defined in relation to a distance R2 which separates it from the axis of rotation generated by the machine. In these conditions, the proximity of the sliding surface 3*a* and the frictional surface 5 defined in this way corresponds to essentially close values of the radii or distances R1 and R2. This proximity has to be sufficient to limit, or avoid, deformation or breakage from by torsion of the male 1 and female 2 parts, caused on the one hand by the traction exerted by sliding the annular means 3 against the peripheral surface 4 of the complementary part and on the other hand by the frictional force of the first male part 1 against the second female part 2.

A feature of the tightening assembly of the disclosure is that it allows the presence of at least one opening 6 surrounded by the annular means 3 to enable for example the positioning of a junction between the conduits of the two parts which are tightened and fixed by the assembly of the disclosure. The tightening assembly thus enables direct or indirect communication, i.e. by means of an additional element, between the male 1 and female 2 parts through the latter. The communication thus enables for example the positioning of a lubrication system or conduit.

According to a first embodiment of the assembly of the disclosure, the annular means 3 is mounted to be fixed in a translational manner to the female part 2.

According to a second embodiment of the assembly of the disclosure the annular means 3 is mounted to be fixed in a translational manner to the male part 1.

According to one particular feature, at least one of the parts, the male 1 or female 2 part, is mounted on the support structure 10. The support structure 10 can be formed by an axial structure comprising at least one hollow part forming a tubular conduit. This assembly can also be formed by fitting and/or by the interaction of a tapping/thread between part of the internal face of the tubular part of the support structure 10 and the peripheral surface of the male 1 or female 2 part.

Figure 7:
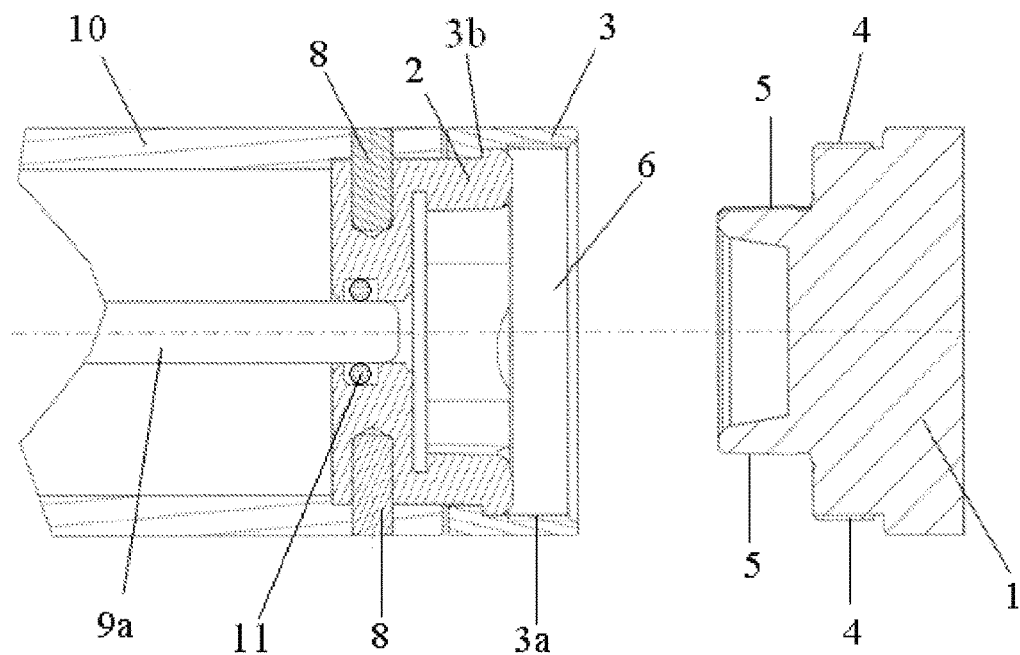
Figure 8:
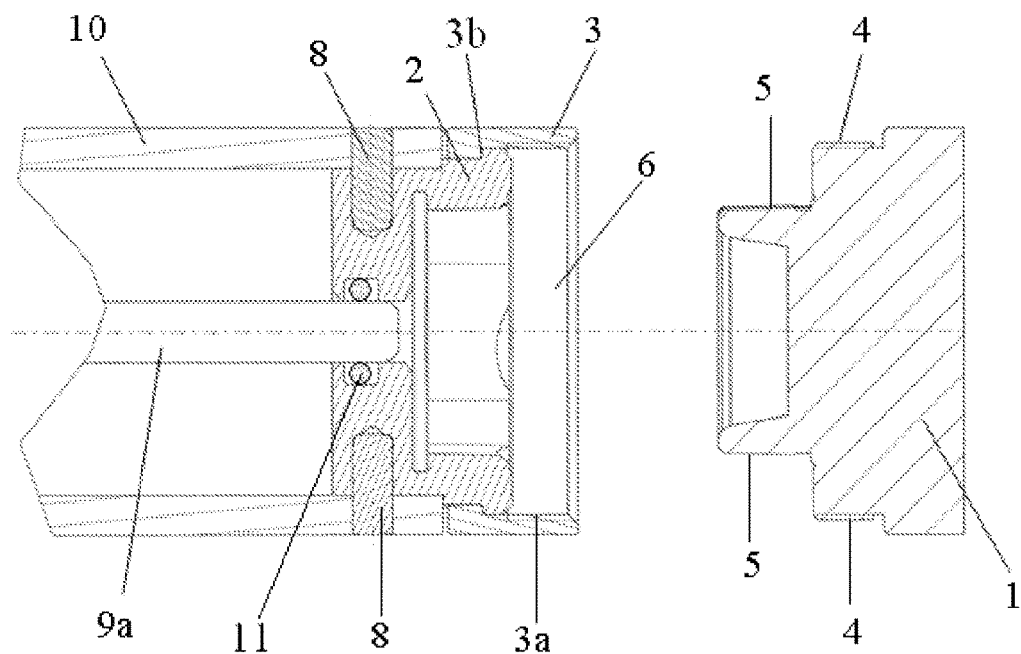

Likewise, the fitting of the male 1 or female 2 part into the support structure 10 can involve a shoulder on the fitted part which comes into abutment with an end of the support structure 10, as shown in FIGS. 4, 6 and 8. Alternatively, the shoulder can be supported by the support structure 10 and receives in abutment the male 1 or female 2 part which is fitted as shown in FIGS. 5 and 7.

Moreover, the locking, securing and/or the connection of the support structure 10 to the part on which the annular means 3 is mounted, i.e. the fitted part, can be performed by one or more pins 8 which interact radially in relation to the axis of insertion of the first male part 1 with the second female part 2. In an alternative or complementary manner, the locking, securing and/or the connection of the support structure 10 to the part on which the means 3 is mounted, i.e. the fitted part, can be performed by a central rod 9 which interacts with the part on which the means 3 is mounted and holds the part locked in a translational manner against the support structure 10. According to an example of the construction, the central rod 9 is formed by an axis 9*a* having a threaded part which interacts with a tapped bore 9*b*. The tapped bore 9*b* can be an element integrated with the male 1 or female 2 part which is mounted on the support structure 10 as shown in FIG. 5 or an element associated with the part mounted on the support structure 10 as shown in FIGS. 4 and 6. According to a non-limiting feature of the disclosure, the central rod 9 and in particular the axis 9*a* can be formed by a tubular conduit for enabling the passage of a fluid.

As shown in FIGS. 7 and 8, according to a non-limiting feature of the disclosure, the axis 9*a* of the central rod 9 interacts with the male 1 or female 2 part which is mounted on the support structure 10 by means of a tightening means 11. The tightening means 11 can be formed for example by a toric ring which surrounds the axis 9*a* of the central rod 9 and is arranged in a housing of the male 1 or female 2 part mounted on the support structure 10.

The disclosure also relates to a component of an assembly for tightening and securing a cutting tool or a tool holder mounted by fitting, characterised in that the component includes an annular structure 3 which is connected in a translational manner to the tool or the tool holder on which the structure 3 is mounted, and in that the annular structure 3 includes a surface 3*a* designed to interact with a peripheral surface 4 of the complementary part fitted with the tool or the tool holder during a rotation of the annular structure 3 in relation to the complementary part.

The disclosure also relates to a method for assembling a first male part 1 against a second female part 2, which have complementary forms by means of the assembly for tightening and securing according to the disclosure. The method is characterised in that it includes in particular:

a stage of positioning the male 1 and female 2 parts relative to one another, a stage of contacting the annular means 3 with the periphery of the part which is complementary to the one which supports the annular means 3, a stage of pivoting the annular means 3 relative to the periphery of the part which is complementary to the one which supports it.

The insertion of the male 1 and female 2 parts can be started independently of the tightening then completed by pivoting the annular means 3 which serves the two parts, or alternatively this pivoting of the annular means 3 relative to the periphery of the complementary part is necessary to enable the assembly of the male 1 and female 2 parts.

Of course, the disclosure is not limited to the embodiment described and represented in the accompanying drawings. Modifications are still possible, particularly from the point of view of the design of the various elements or by substituting equivalent techniques, without departing as such from the scope of protection of the disclosure.

The invention claimed is:

1. An assembly for tightening and securing a first part and a second part fitted together, the first and second parts having complementary forms, the assembly comprising:
   a support structure attached to the second part, the second part being arranged to fit into the support structure;
   at least one contact surface of the first part contactable with the second part; and
   at least one annular ring mounted on a periphery of the second part, said annular ring being rotationally mounted and fixed in an axially translational manner to the second part on which the annular ring is mounted when the annular ring abuts with the second part, and arranged to interact with a peripheral surface of the first part during a rotation of the annular ring in relation to the first part, the annular ring being fixed in the axially translational manner between a stop of the second part on which said annular ring is mounted and an edge of the support structure to which the second part is fixed.

2. The assembly for tightening and securing according to claim 1, wherein the support structure is secured to the second part on which the annular ring is mounted by one or more pins which interact radially in relation to an axis of insertion of the first part and the second part.

3. An assembly for tightening and securing 1 a first part and a second part fitted together, the first and second parts having complementary forms, the assembly comprising:
   a support structure, the second part being attached to the support structure;
   at least one contact surface of the first part contactable with the second part; and
   at least one annular ring mounted on a periphery of the second part, said annular ring being rotationally mounted and fixed in an axially translational manner to the second part on which the annular ring is mounted when the annular ring abuts with the second part, and arranged to interact with a peripheral surface of the first part during a rotation of the annular ring in relation to the first part, the annular ring being fixed in the axially translational manner between a stop of the second part on which said annular ring is mounted and an edge of the support structure to which the second part is fixed, wherein the support structure is secured to the second part on which the annular ring is mounted by a central rod, which interacts with the second part and supports said second part which is locked in a translational manner against the support structure.

4. The assembly for tightening and securing according to claim 3, wherein the central rod is formed by an axis including a threaded part which interacts with a tapped bore in or integrated into the second part mounted on the support structure.

5. The assembly for tightening and securing according to claim 4, wherein the axis of the central rod interacts with the second part mounted on the support structure by a tightening means formed by a toric ring which surrounds the axis of the central rod and is arranged in a housing of the second part.

6. The assembly for tightening and securing according to claim 1, wherein the annular ring is mounted to be axially fixed in the translational manner and loosely in rotation with the second part on which the annular ring is mounted.

7. The assembly for tightening and securing according to claim 1, wherein an inner edge of the annular ring includes a tapping, a screw pitch of which is identical to a pitch of a thread on a peripheral surface of the second part with which the annular ring interacts.

8. The assembly for tightening and securing according to claim 1, wherein the annular ring includes a means for locking the annular ring that interacts with an element on a peripheral surface of the first part.

9. The assembly for tightening and securing according to claim 1, wherein a sliding surface of the annular ring abutting against the peripheral surface of the first part is arranged in the proximity of a frictional surface of the first part with the second part.

10. The assembly for tightening and securing according to claim 1, wherein at least one opening is surrounded by the annular ring to enable the positioning of a junction between conduits of the first and second parts that are tightened and fixed by the tightening assembly.

11. The assembly for tightening and securing according to claim 1, wherein the annular ring includes a surface for interacting with a tightening tool formed by at least one edge.

12. A method for the assembly of a first part with a second part, which have complementary forms, by a tightening and securing assembly, the method comprising:
   positioning the first and second parts relative to one another, the assembly including at least one contact surface of the first part contactable with the second part and at least one annular ring mounted on a periphery of the second part, said annular ring being rotationally mounted and fixed in an axially translational manner to the second part on which the annular ring is mounted, and arranged to interact with a peripheral surface of the first part during a rotation of the annular ring in relation to the first part, the annular ring being fixed in the axially translational manner between a stop of the second part on which said annular ring is mounted and an edge of a support structure to which the second part is fixed;
   contacting the annular ring with the periphery of the first part which is complementary to the second part which supports the annular ring; and
   pivoting the annular ring in relation to the periphery of the first part which is complementary to the second part which supports the annular ring.

* * * * *